(No Model.)
R. A. HADFIELD.
METHOD OF CUTTING SHELLS.
No. 455,816. Patented July 14, 1891.
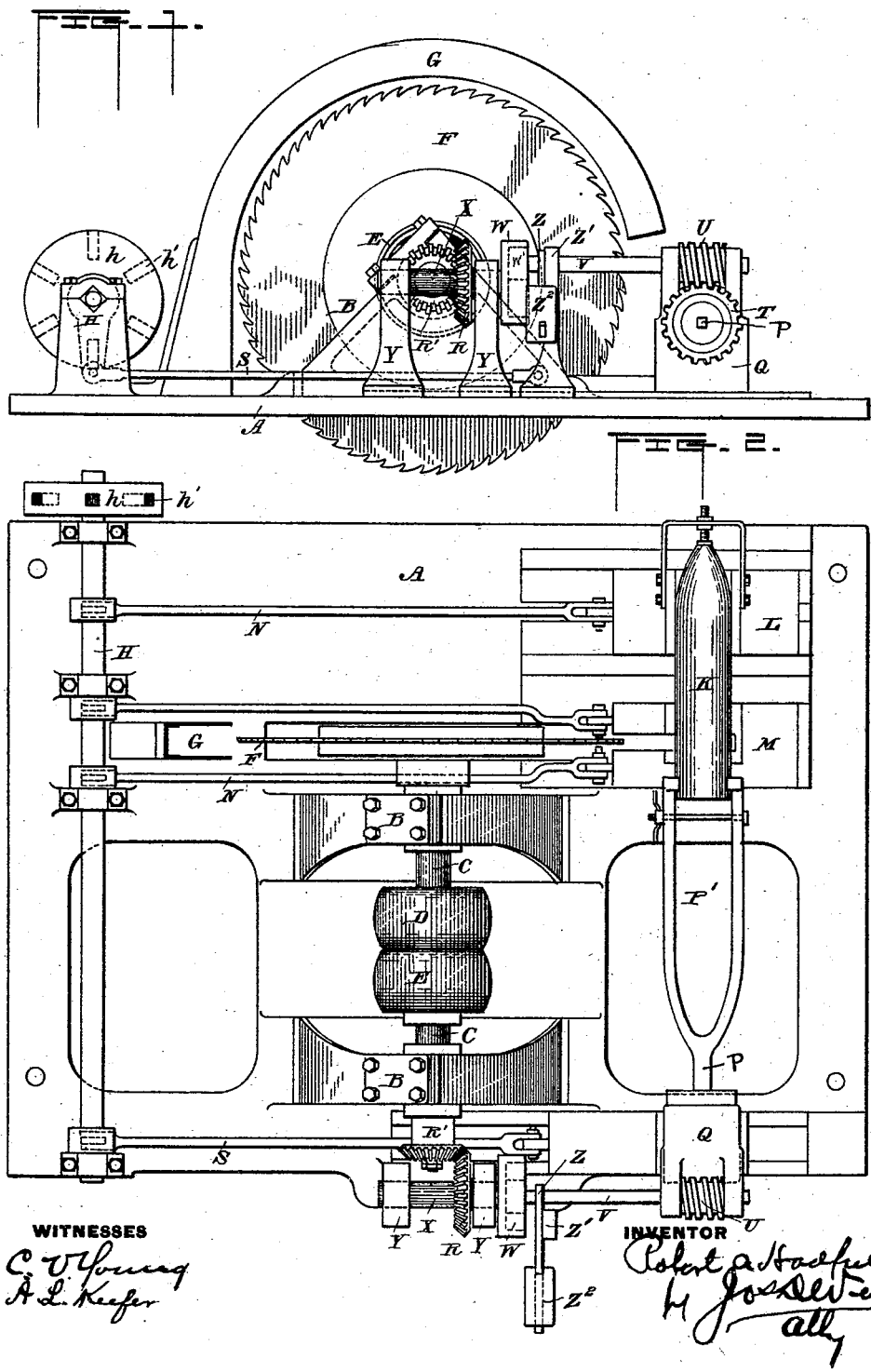
WITNESSES
INVENTOR

UNITED STATES PATENT OFFICE.

ROBERT A. HADFIELD, OF SHEFFIELD, ENGLAND.

METHOD OF CUTTING SHELLS.

SPECIFICATION forming part of Letters Patent No. 455,816, dated July 14, 1891.

Application filed February 11, 1890. Serial No. 340,067. (No model.) Patented in England December 18, 1888, No. 18,493.

*To all whom it may concern:*

Be it known that I, ROBERT A. HADFIELD, of Sheffield, in the county of York, England, have invented a new and useful Improvement in Methods of Cutting Shells, &c., of which the following is a full, clear, and exact description.

This invention consists of a process for hot-sawing cylindrical bodies, and is particularly adapted for cutting off the heads and runners from rollers and projectiles. The difficulty experienced in cutting such articles by means of a rotating saw is in making a straight and even cut. By reason of irregular heat in the article the saw will not act correctly, but is apt to be deflected and to make an irregular or angular cut, which must be shaped subsequently by a tedious and expensive operation. This difficulty has been so serious that heretofore the common practice has been to do the cutting by means of the ordinary machine employing a dividing-tool. I have found, however, that such work may be done with great rapidity and good results produced by sawing the article while hot by a rapidly-revolving saw and simultaneously revolving the article itself continuously and with considerable rapidity. Thus on the one hand a more uniform wear and tear on the saw is effected, since the quantity of metal cut away remains approximately constant, and on the other hand the cut is always kept exactly normal to the axis of the casting.

In the accompanying drawings, Figure 1 is an elevation, and Fig. 2 a plan, of my machine.

F is the circular saw, which is driven by a pulley D. The casting K rests on the two sliding bearings L and M, fixed to the base-plate A. During the process of sawing these bearings are given the necessary forward movement by means of levers N and N', which are connected by gudgeons with the cranks on the shaft H. The latter can be rotated in any convenient manner—*e. g.*, by means of the disk $h$, which is provided with pockets on its circumference for the reception of bars for turning it. The casting is rotated by means of a worm-wheel T, actuated by a worm U, the spindle V of which is driven from the main shaft C by means of bevel-wheels R R' and the friction-rings W W'. The friction-ring W' is pressed against the inner surface of the ring W by means of a counter-weight $Z^2$ and the two-armed lever Z. The bearing Q is brought nearer to the center of the bed-plate in the manner described above by means of a lever S, for which purpose the worm U is allowed to slide on the spindle V. The spindle P of the tongs P' can be rotated from the shaft C in any other convenient manner.

I claim—

The method hereinbefore described of sawing metal articles, which consists in bringing the article while hot into contact with a rapidly-revolving toothed saw and also revolving the article, causing it to perform continuous and numerous revolutions throughout the sawing operation, substantially as and for the purposes described.

In testimony whereof I have hereunto set my hand this 27th day of December, A. D. 1889.

R. A. HADFIELD.

Witnesses:
G. ERNEST BRANSON,
FRANK M. CLARK.